United States Patent
Watanabe et al.

(10) Patent No.: US 8,621,660 B2
(45) Date of Patent: Dec. 31, 2013

(54) PROBE SHAPE EVALUATION METHOD FOR A SCANNING PROBE MICROSCOPE

(71) Applicant: Hitachi High-Tech Science Corporation, Tokyo (JP)

(72) Inventors: Masafumi Watanabe, Tokyo (JP); Hiroumi Momota, Tokyo (JP)

(73) Assignee: Hitachi High-Tech Science Corporation (JP)

( * ) Notice: Subject to any disclaimer, the term of this patent is extended or adjusted under 35 U.S.C. 154(b) by 0 days.

(21) Appl. No.: 13/737,022

(22) Filed: Jan. 9, 2013

(65) Prior Publication Data
US 2013/0180019 A1  Jul. 11, 2013

(30) Foreign Application Priority Data
Jan. 10, 2012  (JP) ................. 2012-002366

(51) Int. Cl.
*G01Q 70/10*  (2010.01)

(52) U.S. Cl.
USPC ............ 850/57; 850/1; 850/2; 850/5; 850/10; 850/21; 850/33; 850/56; 850/19

(58) Field of Classification Search
USPC ........ 850/1, 2, 5, 10, 21, 33, 56, 57; 250/304, 250/306, 307, 310
See application file for complete search history.

(56) References Cited

U.S. PATENT DOCUMENTS 7,493,794 B2 *  2/2009  Mancevski et al. ............ 73/1.79

* cited by examiner

*Primary Examiner* — Jack Berman
*Assistant Examiner* — Meenakshi Sahu
(74) *Attorney, Agent, or Firm* — Adams & Wilks

(57) ABSTRACT

Provided is a method of evaluating a probe tip shape in a scanning probe microscope, including: measuring the probe tip shape by a probe shape test sample having a needle-like structure; determining radii of cross-sections at a plurality of distances from the apex; and calculating, based on the distances and the radii, a radius of curvature when the probe tip shape is approximated by a circle.

2 Claims, 7 Drawing Sheets

F I G. 3
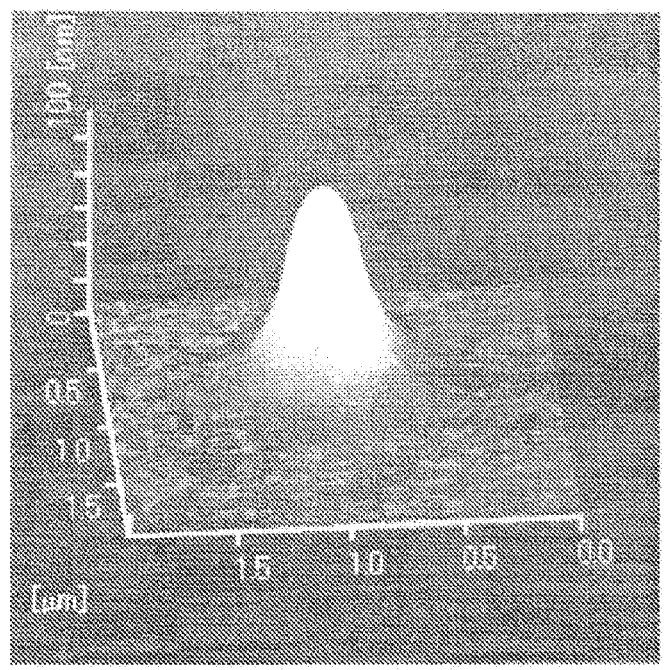
F I G. 4
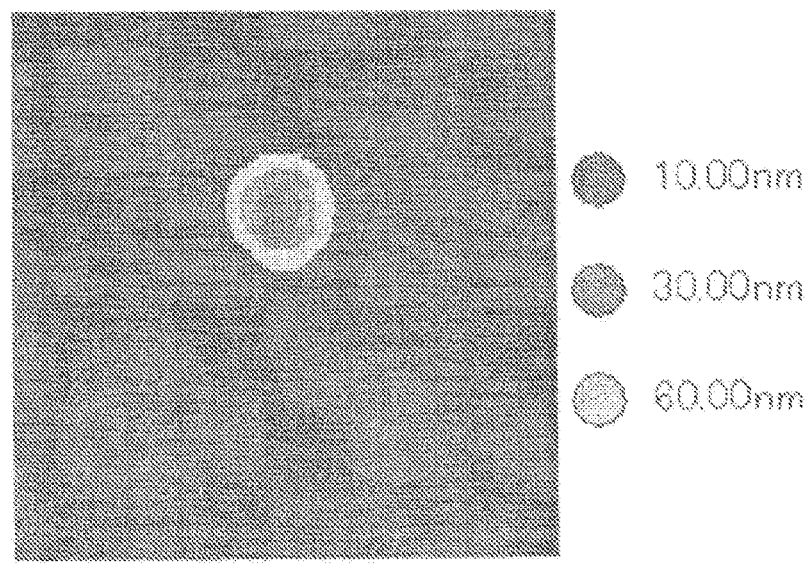

F I G. 7
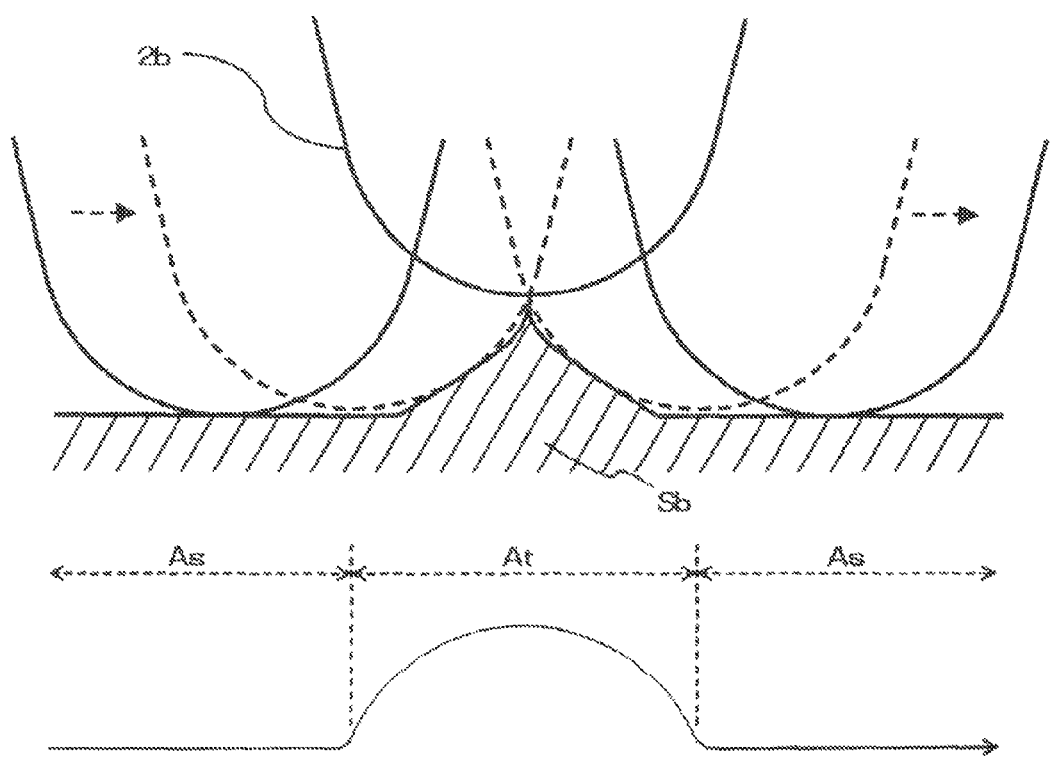

PROBE SHAPE EVALUATION METHOD FOR A SCANNING PROBE MICROSCOPE

BACKGROUND OF THE INVENTION

1. Field of the Invention

The present invention relates to a method of measuring a radius of curvature of a probe of a cantilever used in a scanning probe microscope.

2. Description of the Related Art

In a scanning probe microscope, the tip shape of a probe directly involves a contact state with a sample, and hence it is essential to measure the tip shape of the probe in advance in order to grasp the measurement performance in shape measurement or physical properties measurement of a sample surface. In many cases, in fact, with the assumption that the probe sip is semi-spherical, the sharpness of the probe tip is represented by the radius or the diameter of the hemisphere rather than the tip shape of the probe itself.

Conventionally-used means for measuring the tip shape of the probe are observation by an electron microscope and a method of measuring the shape of a sharp needle-like sample (hereinafter referred to as "probe shape test sample")by a scanning probe microscope to draw the tip shape of the probe. The latter method of using a probe shape test sample $3b$ has an advantage of being simple and not needing another device because the tip shape can be measured under the state where a cantilever is mounted on the scanning probe microscope. This method is therefore generally and widely used.

For example, as described in Japanese Patent Application Laid-open No. 2001-165844, there is known a method in which, based on the shape of a probe $2a$ treasured by the probe shape test sample Sb, the radius of the hemisphere (typically called radius of curvature) of the probe tip is calculated from the angle of a side surface of the probe $2a$ and the width of a curved portion of the tip of the probe $2a$. Alternatively, as described in JIS R1683, "Test method for surface roughness of ceramic thin films by atomic force microscopy", there is known a method in which the tip shape of the probe $2a$ is measured by the probe shape test sample Sb by the scanning probe microscope in such a manner that the tip shape of the probe is measured by a needle of the probe shape test sample at a sharp needle-like protruding tip of the probe shape test sample Sb as illustrated in FIG. 6, and then the diameter of a cross-section at a given distance from the apex of the tip shape of the probe $2a$ is determined (FIG. 8), to thereby evaluate the tip shape of the probe $2a$.

In the probe shape evaluation method described in Japanese Patent Application Laid-open No. 2001-165844, the side surface of the probe $2a$ needs to be linear. The actual probe $2a$ is, however, a microstructure, and hence the side surface is not always manufactured to have a linear shape. Therefore, the boundary between the side surface and the curved portion of the tip cannot be determined accurately, and it is difficult to determine the radius of curvature of the tip by this method.

In the probe shape evaluation method described in JIS R1683, "Test method for surface roughness of ceramic thin films by atomic force microscopy", the evaluation is performed in such a manner that, on the premise that the probe tip has a cylinder shape in which the width is substantially identical even on the root side of the hemisphere of the tip, the diameter of such cylinder part is regarded as the diameter of the hemisphere of the tip. However, the required preconditions in this evaluation method are that the height at which the shape is measurable by the above-mentioned probe shape test sample Sb is larger than the radius of curvature and that the root part of the hemisphere has a shape that can be approximated as a cylinder having a constant diameter. However, there are various kinds of probe shapes depending on their uses. In some of the probes, the hemisphere of the tip is enlarged by design, while in others, the root part of the hemisphere of the probe has a tapered shape rather than a cylinder. The method described in JIS R1683, "Test method for surface roughness of ceramic thin films by atomic force microscopy" may be inapplicable to the probe having such a special shape. For example, as illustrated in FIG. 7, in the case where the radius of curvature of the probe is larger than the height of a convex portion of the probe shape test sample Sb, that is, larger than the height at which the shape of the probe is measurable, the probe shape in a region At for measuring the probe shape is traced by the probe shape test sample only for a part of the hemisphere of the tip as illustrated in FIG. 9. Further, in this case, even when the diameter of the cross-section at a predetermined distance from the apex of the probe tip shape is determined as described in JIS R1683, "Test method for surface roughness of ceramic thin films by atomic force microscopy", the determined diameter is not coincident with the diameter of the hemisphere of the probe tip.

SUMMARY OF THE INVENTION

In view of the above, the present invention provides means for evaluating a tip shape of a probe $2b$ having a large radius of curvature even in the case where a height at which the shape is measurable by a probe shape test sample Sb is smaller than the radius of curvature of the probe tip.

As described above, in the evaluation method described in JIS R1683, "Test method for surface roughness of ceramic thin films by atomic force microscopy", the diameter of the hemisphere of the probe tip cannot be evaluated accurately in the case where the height at which the shape is measurable by the probe shape test sample Sb is smaller than the radius of curvature of the probe. As a countermeasure, as illustrated in FIG. 2, the radii of cross-sections (such as $r_0$ to $r_4$ in FIG. 2) at a plurality of distances (such as $h_0$ to $h_4$ in FIG. 2) from the apex of the measured shape of the probe tip are determined, and the distances and the radii are substituted in Expression 1 to calculate a radius of curvature $R_{tip}$ when the probe tip shape illustrated in FIG. 2 is approximated by a circle.

Specifically, a probe shape evaluation method according to an exemplary embodiment of the present invention includes: a proximity step of relatively bringing a tip of a probe provided to a scanning probe microscope one of into contact with and into close distance at a predetermined interval to a surface of an evaluation sample (probe shape test sample) disposed to oppose the tip of the probe; a scanning step of performing predetermined scanning while keeping a constant physical quantity that acts between the tip of the probe and the surface of the evaluation sample; a data acquisition step of acquiring a surface shape of the evaluation sample; a data extraction step of extracting, from pieces of acquired data, at least two sets of data pieces each containing a predetermined height (h) on a central axis drawn from an apex of the probe and a distance (r) between the central axis and an outer edge of the measured tip shape at the predetermined height, the at least two sets of data pieces having different heights (h); and a calculation step of calculating, based on the heights (h) and the distances (r) of the at least two extracted sets of data pieces, a radius of curvature ($R_{tip}$) when the tip of the probe is approximated as a spherical shape.

According to the probe shape evaluation method according to the exemplary embodiment of the present invention, the radius of curvature of the probe can be measured even for a probe having a non-linear side surface and the probe $2b$ having the radius of curvature larger than the height at which the shape is measurable by the probe shape test sample Sb.

BRIEF DESCRIPTION OF THE DRAWINGS

In the accompanying drawings:

FIG. 3 is an image showing an example of a result of the probe shape according to the probe shape evaluation method of the present invention;

FIG. 4 is an image showing an example of the result of the probe shape according to the probe shape evaluation method of the present invention;

FIG. 7 is a diagram illustrating the measurement of the shape of a probe having a large radius of curvature by the probe shape test sample;

DETAILED DESCRIPTION OF THE PREFERRED EMBODIMENT

Figure 1:
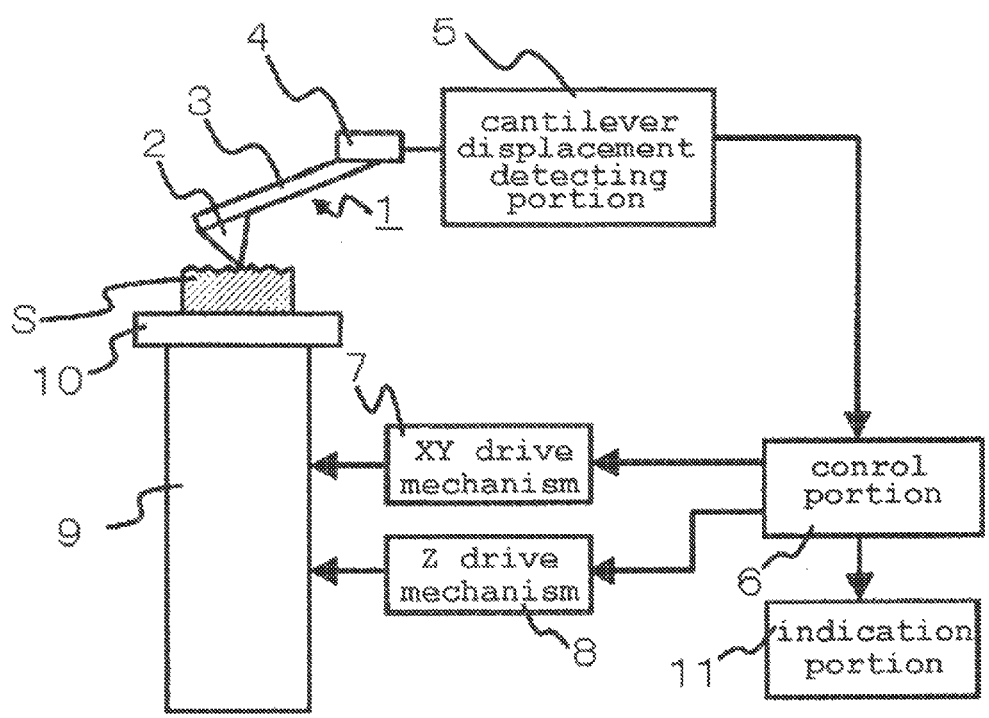
FIG. 1 is a schematic diagram illustrating a scanning probe microscope used in a probe shape evaluation method of the present invention.
Figure 1:
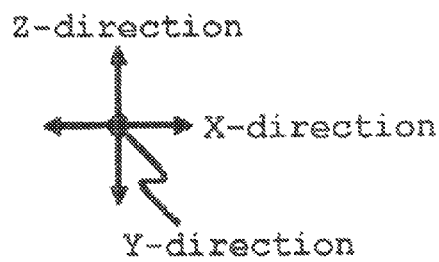

First, an exemplary scanning probe microscope used in a probe shape evaluation method of the present invention is described with reference to FIG. 1.

The scanning probe microscope of the present invention includes a cantilever 1 including a probe 2, lever oscillating means 4, and a cantilever displacement detection portion 5. The probe 2 of the cantilever 1 is disposed so that a probe tip faces the surface of an object to be measured S placed on a sample stage 10. The probe 2 is capable of scanning in the X and Y directions parallel to the surface of the object to be measured S and moving in the Z direction perpendicular to the surface of the object to be measured S relatively with respect to the surface of the object to be measured S. The lever oscillating means 4 is capable of oscillating the cantilever 1. The cantilever displacement detection portion 5 detects a displacement of the cantilever 1. The sample stage 10 is mounted on a three-dimensional actuator 9, thus being capable of moving the probe 2 and the surface of the object to be measured S relatively in the X and Y directions and the Z direction. Further, the measurement result is displayed to a indication portion 11.

The three-dimensional actuator 9 is connected to an XY drive mechanism 7 and a Z drive mechanism 8 for driving the three-dimensional actuator 9 to scan the surface of the object to be measured S in the X, Y, and Z directions.

The XY drive mechanism 7 and the Z drive mechanism 8 are connected to a control portion 6 and controlled by the control portion 6.

Next, a probe shape evaluation method according to an embodiment of the present invention is described in accordance with a measurement procedure.

In the probe shape evaluation method according to the present invention, first, the cantilever including a probe 2b having a large radius of curvature, for which the probe shape is to be measured, is mounted onto the scanning probe microscope. Then, a probe shape test sample Sb having a sharp needle-like structure formed on a wafer, whose tip has a radius of curvature of 10 nm or less, is placed on a sample hold portion of the scanning probe microscope.

Next, as illustrated in FIG. 7, the probe 2b having a large radius of curvature, for which the probe shape is to be evaluated, is used to measure the shape of the probe shape test sample Sb. In this case, a measurement region is set in advance so that one of the needle-like structures present on the surface of the probe shape test sample Sb may come to the vicinity of the center of the measurement region and that the measurement region may cover the range wide enough for the needle-like structure to measure the shape of the probe 2b having a large radius of curvature.

By measuring the shape by the scanning probe microscope in this manner, the tip shape of the semi-spherical portion of the tip of the probe 2b having a large radius of curvature is measured by the probe shape test sample Sb.

Figure 2:
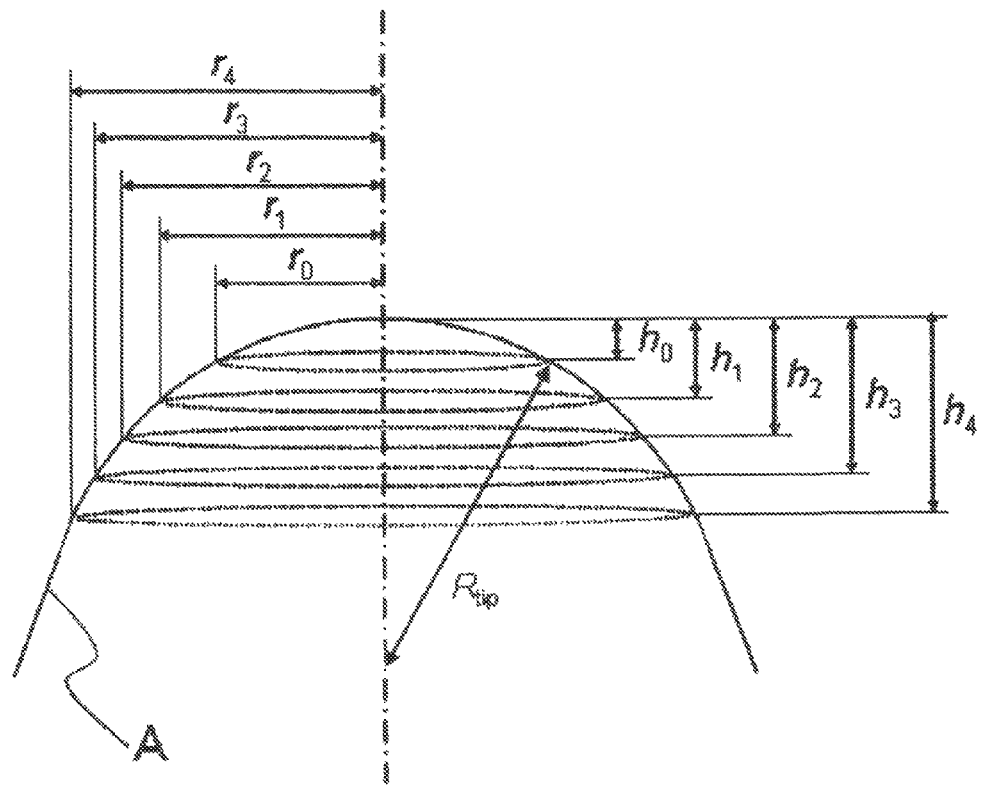
FIG. 2 is a conceptual diagram of evaluation on a probe shape according to the probe shape evaluation method of the present invention.

Next, from the thus measured shape A of the semi-spherical portion of the tip of the probe, as illustrated in FIG. 2, the cross-section of the hemisphere of the probe tip at each distance h from the apex is approximated as circular, and its radius r is measured at each of a plurality of distances $h_1$. In this case, the radius r of the hemisphere is determined in such a manner that an area S of the cross-section is substituted in Expression 2 to determine the radius of a circle having the same area as the cross-sectional area S and this radius is regarded as the radius when the cross-section is approximated by a circle. In Expression 2, "S" represents the cross-sectional area at an arbitrary position, "r" represents the radius when the cross-section is approximated by a circle, and "n" represents the ratio of a circle's circumference.

Next, the distances $h_1$ from the apex and the radii $r_1$ of the cross-sections at the respective distances are substituted in Expression 1 to calculate the radius when the tip shape of the probe 2b having a large radius of curvature is approximated by a hemisphere. The calculated radius is regarded as the radius of curvature of the probe 2b. In Expression 1, "h" is the distance from the apex, "r" is the radius of the cross-section at the distance h, and "$R_{tip}$" represents the radius of curvature of the probe.

By calculating the radius of curvature of the tip of the probe 2b in this way, the shape of the probe can be evaluated.

$$R_{tip} = \frac{\sum_{i=0}^{n} h_i^2 + \sum_{i=0}^{n} r_i^2}{2 \sum_{i=0}^{n} h_i} \qquad \text{(Expression 1)}$$

$$r = \sqrt{\frac{S}{\pi}} \qquad \text{(Expression 2)}$$

FIG. 3 shows data of the measurement result of the probe shape A obtained by measuring the probe tip shape with the use of the probe shape test sample Sb and representing the probe tip shape in a three-dimensional manner. The probe 2 is displayed so that the tip is convex. FIG. 4 shows the cross-sections of such protruding shape, which are sliced in the horizontal direction at positions lower by arbitrary distances in the vertical direction from the apex of the probe 2 corresponding to the top of the protruding part (although FIG. 4 shows the cross-sections sliced at positions of 10 nm, 30 nm and 60 nm, the positions for slicing are a plurality or arbitrary positions smaller than the radius of curvature of the probe 2).

FIG. 4 shows the cross-sectional shapes at arbitrary heights (10, 30, and 60 nm in the figure) from the apex in the measurement result of the probe shape A of FIG. 3 in the form of the contour. As shown in FIG. 4, the cross-sectional shapes are not always circular but, by determining the radius of a circle having the same area as the cross-sectional area S, the radius of a circle when the cross-section is approximated by a circle is determined.

Figure 5:
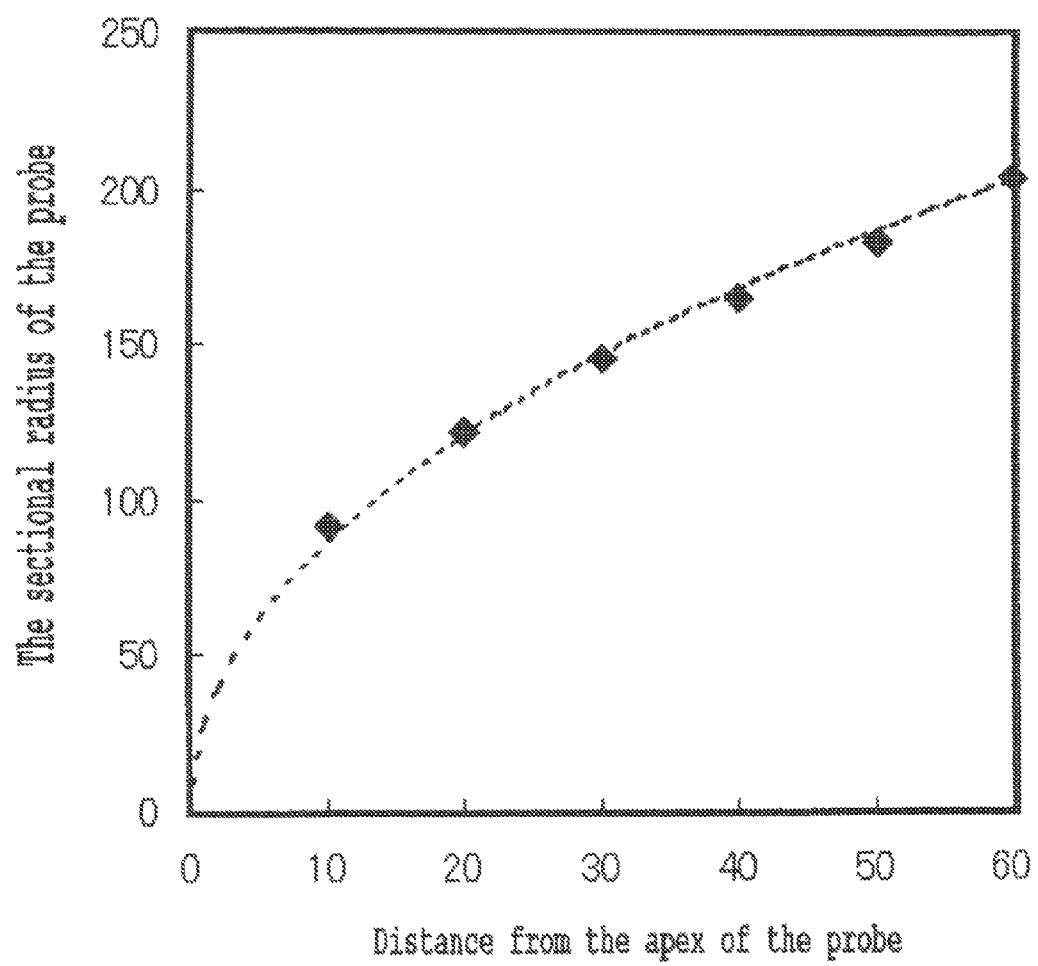
FIG. 5 is a graph showing an example of the result of the probe shape according to the probe shape evaluation method of the present invention.
Figure 6:
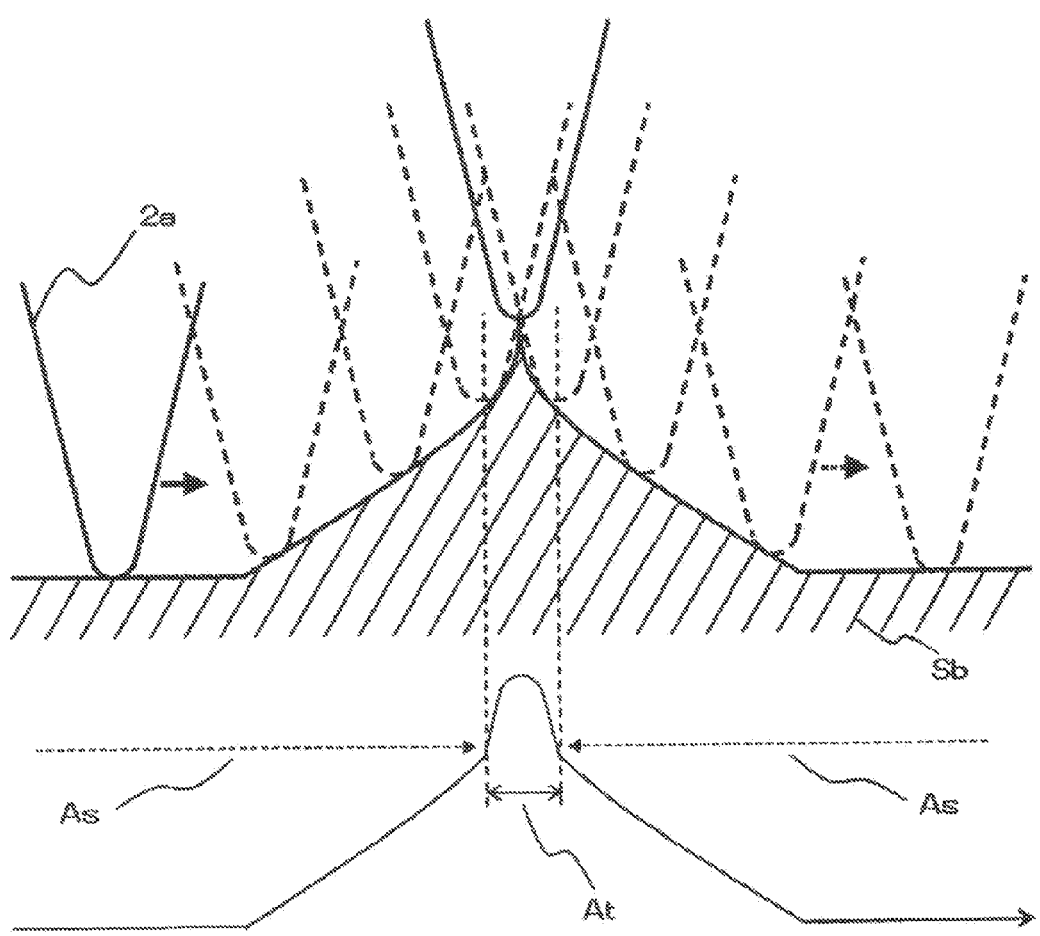
FIG. 6 is a diagram illustrating the measurement of the shape of a probe by a probe shape test sample.
Figure 8:
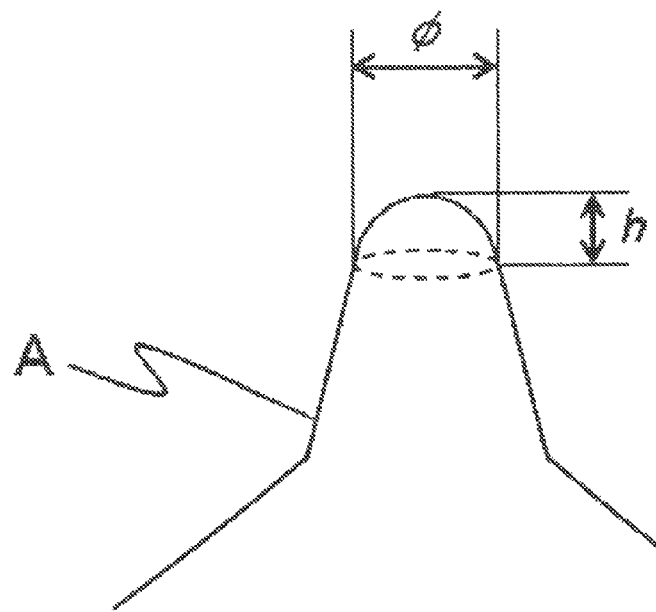
FIG. 8 is a conceptual diagram of evaluation on the probe shape according to a conventional probe shape evaluation method.
Figure 9:
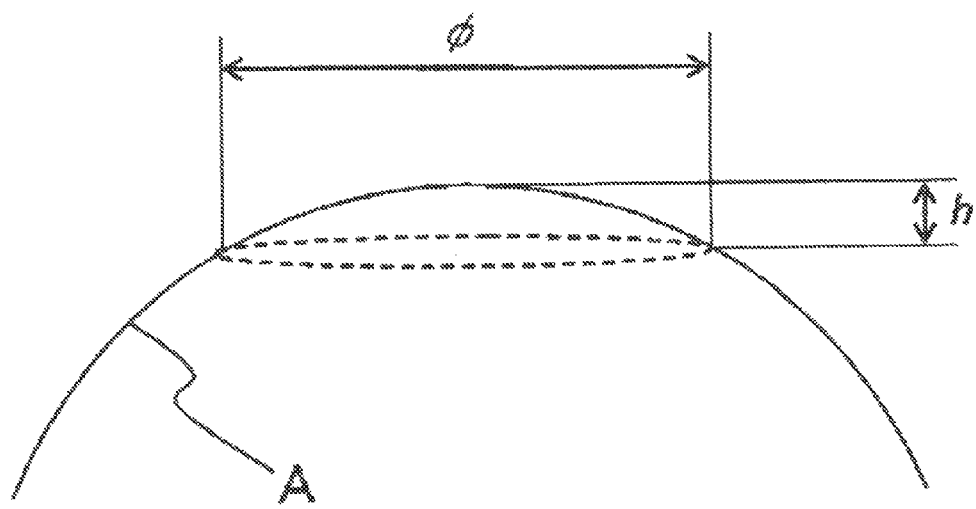
FIG. 9 is a conceptual diagram of the evaluation on the probe shape according to the conventional probe shape evaluation method.

The plots of FIG. 5 show the plurality of arbitrary distances from the apex and the radii of the cross-sections at those positions in the form of a graph, which are measured by the method described above. The dotted line shows an approximate curve obtained by approximating the respective points of FIG. 5 by a circle based on Expression 1.

What is claimed is:

1. A probe shape evaluation method of measuring a tip shape of a probe by a scanning probe microscope to evaluate sharpness of a tip of the probe, comprising:

a proximity step of relatively bringing the tip of the probe provided to the scanning probe microscope one of into contact with and into close distance at a predetermined interval to a surface of an evaluation sample disposed to oppose the tip of the probe;

a scanning step of performing predetermined scanning while keeping a constant physical quantity that acts between the tip of the probe and the surface of the evaluation sample;

a data acquisition step of acquiring a surface shape of the evaluation sample;

a data extraction step of extracting, from pieces of acquired data, at least two sets of data pieces each containing a predetermined height (h) on a central axis drawn from an apex of the probe and a distance (r) between the central axis and an outer edge of the measured tip shape at the predetermined height, the at least two sets of data pieces having different heights (h); and a calculation step of calculating, based on the heights (h) and the distances (r) of the at least two extracted sets of data pieces, a radius of curvature ($R_{tip}$) when the tip of the probe is approximated as a spherical shape.

2. A probe shape evaluation method according to claim 1, wherein the calculating is based on the following expression:

$$R_{tip} = \frac{\sum_{i=0}^{n} h_i^2 + \sum_{i=0}^{n} r_i^2}{2 \sum_{i=0}^{n} h_i}.$$

* * * * *